Sept. 6, 1927.  J. H. STOCKHOLDER  1,641,240
FLOAT CONTROLLED VALVE
Filed Jan. 18, 1927
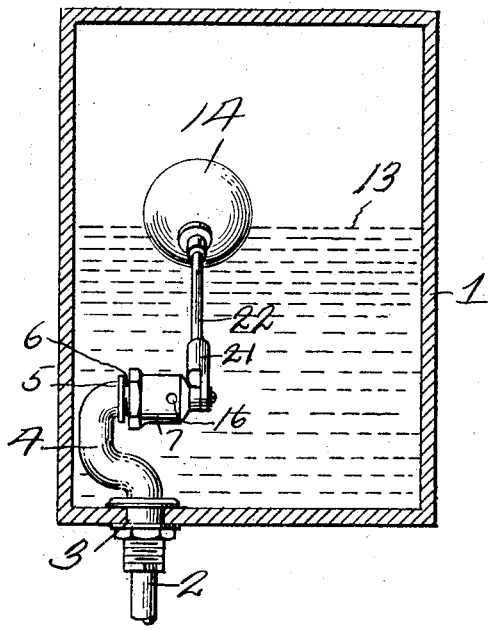
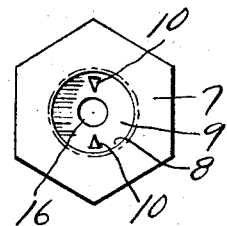
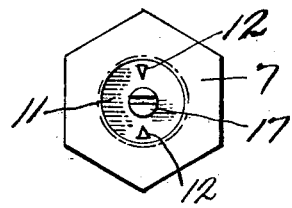
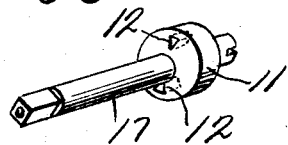
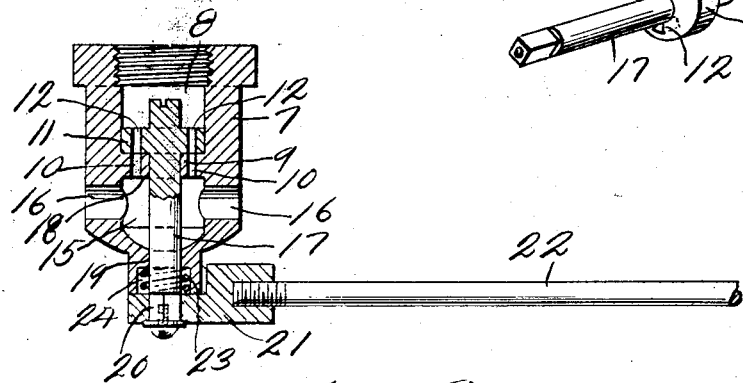
Inventor
John H. Stockholder
By Philip A. H. Serell
Attorney Patented Sept. 6, 1927.

1,641,240

UNITED STATES PATENT OFFICE.

JOHN H. STOCKHOLDER, OF NEW ORLEANS, LOUISIANA.

FLOAT-CONTROLLED VALVE.

Application filed January 18, 1927. Serial No. 161,779.

The invention relates to float controlled valves, and has for its object to provide a device of this character particularly adapted for maintaining a constant liquid level in a receptacle, for instance in a boiler, however applicable for general use, and the valve constructed in a manner whereby deterioration thereof incident to corrosion or collection of foreign matter on the valve surfaces is obviated, as well as the use of packing.

A further object is to provide a valve comprising a casing having a chamber therein, the bottom of which chamber is formed by a flat valve seat having ports therein and a disc valve having ports therein engaging the valve seat and provided with a stem extending through a second chamber in the casing and to which stem the float arm is connected. Also discharge ports in the casing in communication with the second chamber for allowing the water which passes through the valve as a whole to be discharged in the receptacle or boiler.

A further object is to form the disc valve and the stem thereof integral and to interpose a spring between the float arm and the casing around the stem in a chamber in the casing, which spring imparts a longitudinal pressure on the valve stem in one direction, thereby maintaining the disc valve seated at all times.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawing:

Figure 1 is a sectional view through a receptacle, showing the float controlled valve applied thereto.

Figure 2 is a horizontal sectional view through the valve casing and valve.

Figure 3 is a plan view looking into the valve casing with the disc valve removed.

Figure 4 is a view similar to Figure 3, but showing the disc valve within the casing.

Figure 5 is a perspective view of the disc valve and valve stem.

Referring to the drawing the numeral 1 designates a conventional form of receptacle, for instance a boiler, flush tank, or any other receptacle it is desired to maintain a constant liquid level in, or for refilling. Extending into the receptacle 1 is a supply pipe 2 having a water tight connection at 3 with the receptacle, and which supply pipe within the receptacle is preferably provided with a goose neck 4 terminating in a horizontally disposed portion 5, in which portion 5 is threaded in the usual manner a nipple 6, and on which nipple the horizontally disposed valve casing 7 is threaded. The valve casing 7 is provided with a cylindrical chamber 8, the bottom of which is formed by a flat valve seat 9 having ports 10 extending therethrough, and with which valve seat a disc valve 11 engages and has a ground engagement. Disc valve 11 also has a ground engagement with the periphery of the chamber 8 whereby passage of water or foreign matter between the disc valve and the valve seat is prevented, thereby preventing corrosion or improper seating of the disc valve 11 at all times, and at the same time obviating packings as at present utilized in valves, which have to be renewed from time to time incident to deterioration and consequent leakage. The disc valve 11 is provided with ports 12, which are adapted to register with the ports 10 when the liquid level 13 drops below a certain point, consequently additional water will be allowed to enter the receptacle 1 through the registering ports 10 and 12 until the disc valve 11 is again rotated through the medium of the float 14 to a position where the ports 10 and 12 are out of registration. The casing 7 is provided with a second chamber 15 into which the water enters and is discharged to the receptacle 1 through the ports 16, and the number of ports 16, as well as the number of ports 10 and 12 may vary according to the particular use to which the device is placed and the volume of water it is desired to feed.

Disc valve 11 is provided with an integral valve stem 17 which is rockably mounted in a bearing 18 of the valve seat 9 and in a bearing 19 in the end of the casing 7, and terminates in an angularly shaped portion 20 on which is disposed the member 21 which carries the arm 22 on the outer end of which is mounted the float 14. It is obvious it will be necessary to maintain the disc valve 11 in close engagement with the seat 9 at all times to obtain the best result, and to take up any wear which may take place on the seat and valve 11 and to accomplish this result a coiled spring 23 is provided which coiled spring surrounds the valve stem 17 and is disposed in a chamber 24 in the casing 7, the outer end of which chamber is maintained closed by the member 21, thereby preventing any sediment or foreign matter from reaching the chamber and interfering with the expansive action of the coiled spring, therefore it will be seen that the coiled spring is thoroughly protected at all times.

From the above it will be seen that a float controlled disc valve is provided which is simple in construction, the use of packing obviated, the parts reduced to a minimum, and one which may be cheaply manufactured and sold. It will also be seen that the valve is particularly adapted for use where it is desired to maintain a constant liquid level in a receptacle, for instance as a boiler or tank, and by varying the shape of the ports, for instance arcuately shaping the same, the device may be used in connection with a flush tank for refilling the tank after a flushing operation and cutting off the flow of water after the liquid within the tank has reached a predetermined level.

The invention having been set forth what is claimed as new and useful is:—

The combination with a receptacle, of a liquid level maintaining valve therein, said valve comprising an intake pipe extending into the receptacle, a valve casing carried by said intake pipe and having a chamber therein, a disc valve seat in said chamber and having ports therethrough, a disc valve engaging the valve seat within the chamber and the wall of the chamber, a valve stem carried by said disc valve and rotatably mounted in the valve seat, said valve stem extending through a water receiving chamber at the opposite side of the valve seat and which chamber has discharge ports through the casing, said valve stem being rotatably mounted in the end of the casing, a coiled spring surrounding the valve stem within a chamber in the end of the casing, an arm mounted on said valve stem and forming a closure for the spring chamber, and a float carried by said arm.

In testimony whereof I hereunto affix my signature.

JOHN H. STOCKHOLDER.